US012240232B2

United States Patent
Wakasa

(12) United States Patent
Wakasa

(10) Patent No.: US 12,240,232 B2
(45) Date of Patent: Mar. 4, 2025

(54) LIQUID DISCHARGE APPARATUS, LIQUID DISCHARGE METHOD, AND STORAGE MEDIUM

(71) Applicant: Ryohki Wakasa, Kanagawa (JP)

(72) Inventor: Ryohki Wakasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 18/174,065

(22) Filed: Feb. 24, 2023

(65) Prior Publication Data

US 2023/0271417 A1 Aug. 31, 2023

(30) Foreign Application Priority Data

Feb. 25, 2022 (JP) ................................ 2022-027727

(51) Int. Cl.
*B41J 2/045* (2006.01)

(52) U.S. Cl.
CPC ......... *B41J 2/0456* (2013.01); *B41J 2/04526* (2013.01); *B41J 2/04581* (2013.01)

(58) Field of Classification Search
CPC ... B41J 11/006; B41J 11/0015; B41J 11/0095; B41J 2/16517; B41J 2/16526; B41J 2/16529; B41J 2203/01; B41J 2/2114; B41J 2/17; B41J 2/04581; B41J 2/04503; B41J 2/04505; B41J 2/04506; B41J 2/04508; B41J 2/0451; B41J 2/04513; B41J 2/04515; B41J 2/0452; B41J 2/04553; B41J 2/04555; B41J 2/04556; B41J 2/04558; B41J 2/0456; B41J 2/04561; B41J 2/04563; B41J 2/04565; B41J 2/04566; B41J 3/4073; B41J 2/04525; B41J 2/04526; B41J 2/04528; B41J 2/04531; B41J 2/04535; B41J 2/04536; B41J 2/04538; B41J 2/0454; B41J 2/04551; B41J 2/04571; B41J 2/125
See application file for complete search history.

(56) References Cited

U.S. PATENT DOCUMENTS

2013/0076817 A1 3/2013 Olson et al.

FOREIGN PATENT DOCUMENTS

| | | |
|---|---|---|
| EP | 2327555 | 6/2011 |
| JP | 2001-260329 | 9/2001 |
| JP | 2007-331257 | 12/2007 |
| JP | 2017-192932 | 10/2017 |

(Continued)

OTHER PUBLICATIONS

Extended European Search Report for 23158422.8 mailed on Jul. 17, 2023.

*Primary Examiner* — Kristal Feggins
(74) *Attorney, Agent, or Firm* — IPUSA, PLLC

(57) ABSTRACT

A liquid discharge apparatus includes a head, a driver, and circuitry. The head has multiple nozzles and discharges a liquid from each of multiple nozzles to an object in a flight direction to form a film on a surface of the object. The driver moves at least one of the head or the object relative to other of the head or the object. The circuitry determines an amount of the liquid discharged from each of the multiple nozzles based on a flight angle between the flight direction and a normal direction of the surface of the object for each of the multiple nozzles and causes the head to discharge the liquid from each of the multiple nozzles for the amount of the liquid determined for each of the multiple nozzles.

8 Claims, 12 Drawing Sheets

(56) References Cited

FOREIGN PATENT DOCUMENTS

| | | | | |
|---|---|---|---|---|
| JP | 2018-001571 | | 1/2018 | |
| JP | 2021-088109 | | 6/2021 | |
| WO | 2014/163196 | | 10/2014 | |
| WO | WO-2014163196 A1 | * | 10/2014 | .............. B05D 1/26 |

* cited by examiner

| | | TARGET DISTANCE 10[mm] | | | | | TARGET DISTANCE 20[mm] | | | | | TARGET DISTANCE 30[mm] | | | | |
|---|---|---|---|---|---|---|---|---|---|---|---|---|---|---|---|---|
| | | FLIGHT ANGLE [DEGREES] | | | | | FLIGHT ANGLE [DEGREES] | | | | | FLIGHT ANGLE [DEGREES] | | | | |
| | | 0 | 15 | 30 | 45 | 60 | 0 | 15 | 30 | 45 | 60 | 0 | 15 | 30 | 45 | 60 |
| HEAD ANGLE [DEGREES] | 0 | A1_1 | A2_1 | A3_1 | A4_1 | A5_1 | B1_1 | B2_1 | B3_1 | B4_1 | B5_1 | C1_1 | C2_1 | C3_1 | C4_1 | C5_1 |
| | 15 | A1_2 | A2_2 | A3_2 | A4_2 | A5_2 | B1_2 | B2_2 | B3_2 | B4_2 | B5_2 | C1_2 | C2_2 | C3_2 | C4_2 | C5_2 |
| | 30 | A1_3 | A2_3 | A3_3 | A4_3 | A5_3 | B1_3 | B2_3 | B3_3 | B4_3 | B5_3 | C1_3 | C2_3 | C3_3 | C4_3 | C5_3 |
| | 45 | A1_4 | A2_4 | A3_4 | A4_4 | A5_4 | B1_4 | B2_4 | B3_4 | B4_4 | B5_4 | C1_4 | C2_4 | C3_4 | C4_4 | C5_4 |
| | 60 | A1_5 | A2_5 | A3_5 | A4_5 | A5_5 | B1_5 | B2_5 | B3_5 | B4_5 | B5_5 | C1_5 | C2_5 | C3_5 | C4_5 | C5_5 |
| | 75 | A1_6 | A2_6 | A3_6 | A4_6 | A5_6 | B1_6 | B2_6 | B3_6 | B4_6 | B5_6 | C1_6 | C2_6 | C3_6 | C4_6 | C5_6 |
| | 90 | A1_7 | A2_7 | A3_7 | A4_7 | A5_7 | B1_7 | B2_7 | B3_7 | B4_7 | B5_7 | C1_7 | C2_7 | C3_7 | C4_7 | C5_7 |
| | 105 | A1_8 | A2_8 | A3_8 | A4_8 | A5_8 | B1_8 | B2_8 | B3_8 | B4_8 | B5_8 | C1_8 | C2_8 | C3_8 | C4_8 | C5_8 |
| | 120 | A1_9 | A2_9 | A3_9 | A4_9 | A5_9 | B1_9 | B2_9 | B3_9 | B4_9 | B5_9 | C1_9 | C2_9 | C3_9 | C4_9 | C5_9 |
| | 135 | A1_10 | A2_10 | A3_10 | A4_10 | A5_10 | B1_10 | B2_10 | B3_10 | B4_10 | B5_10 | C1_10 | C2_10 | C3_10 | C4_10 | C5_10 |
| | 150 | A1_11 | A2_11 | A3_11 | A4_11 | A5_11 | B1_11 | B2_11 | B3_11 | B4_11 | B5_11 | C1_11 | C2_11 | C3_11 | C4_11 | C5_11 |
| | 165 | A1_12 | A2_12 | A3_12 | A4_12 | A5_12 | B1_12 | B2_12 | B3_12 | B4_12 | B5_12 | C1_12 | C2_12 | C3_12 | C4_12 | C5_12 |
| | 180 | A1_13 | A2_13 | A3_13 | A4_13 | A5_13 | B1_13 | B2_13 | B3_13 | B4_13 | B5_13 | C1_13 | C2_13 | C3_13 | C4_13 | C5_13 |

FIG. 13

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119 (a) to Japanese Patent Application No. 2022-027727, filed on Feb. 25, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing a plurality of instructions.

Related Art

In the related art, a liquid discharge apparatus forms a film on a surface of an object with a liquid. Such a liquid discharge apparatus is used for coating the surface of the object.

SUMMARY

Embodiments of the present disclosure describe an improved liquid discharge apparatus that includes a head, a driver, and circuitry. The head has multiple nozzles and discharges a liquid from each of multiple nozzles to an object in a flight direction to form a film on a surface of the object. The driver moves at least one of the head or the object relative to other of the head or the object. The circuitry determines an amount of the liquid discharged from each of the multiple nozzles based on a flight angle between the flight direction and a normal direction of the surface of the object for each of the multiple nozzles and causes the head to discharge the liquid from each of the multiple nozzles for the amount of the liquid determined for each of the multiple nozzles.

According to other embodiments of the present disclosure, there are provided a liquid discharge method and a non-transitory storage medium storing a plurality of instructions which, when executed by one or more processors, causes the processors to perform the liquid discharge method. The method includes discharging a liquid from each of multiple nozzles of a head to an object in a flight direction to form a film on a surface of the object, moving at least one of the head or the object relative to other of the head or the object, determining an amount of the liquid discharged from each of the multiple nozzles based on a flight angle between the flight direction and a normal direction of the surface of the object for each of the multiple nozzles, and discharging the liquid from each of the multiple nozzles for the amount of the liquid determined for each of the multiple nozzles.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 is a table illustrating a method of determining the liquid discharge amount according to the second embodiment;

Figure 1:
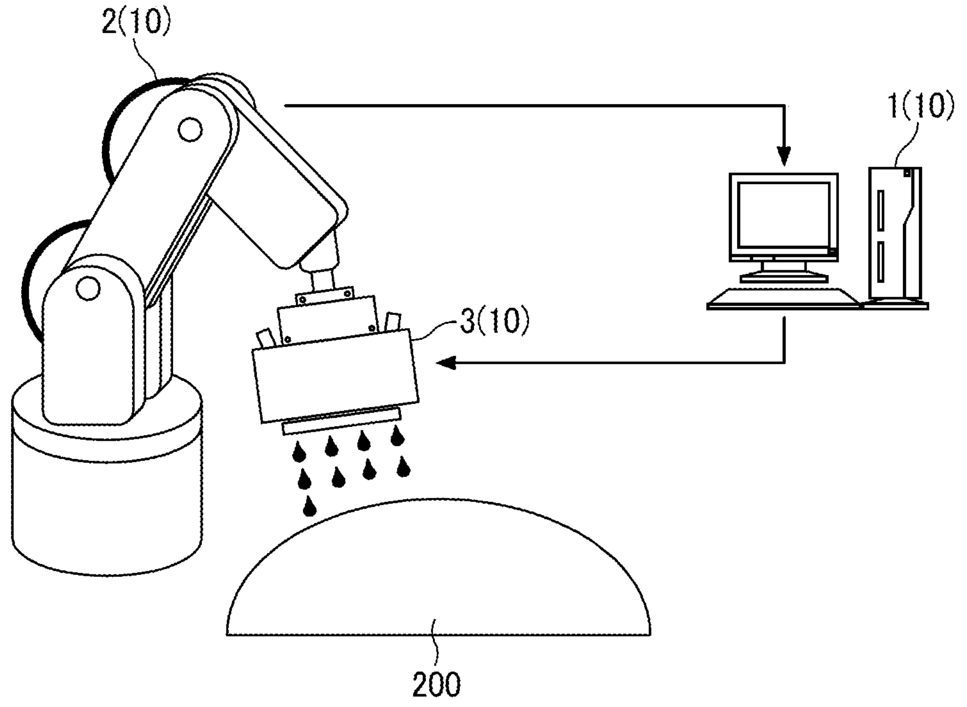
FIG. 1 is a schematic view of a liquid discharge apparatus according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

A liquid discharge apparatus according to an embodiment of the present disclosure is described with reference to the drawings. However, embodiments described below are some examples of the liquid discharge apparatus for embodying the technical idea of the present disclosure, and embodiments of the present disclosure are not limited to the embodiments described below. The dimensions, materials, and shapes of components, relative arrangements thereof, and the like described below are not intended to limit the scope of the present disclosure thereto unless otherwise specified and are only examples for explanation. The size, positional relation, and the like of components illustrated in the drawings may be exaggerated for clarity of description. In the following description, the same names and the same reference codes represent the same or equivalent components, and a detailed description thereof is omitted as appropriate.

EMBODIMENTS

Overall Configuration of Liquid Discharge Apparatus

An overall configuration of a liquid discharge apparatus 10 is described with reference to FIGS. 1 and 2. FIG. 1 is a Schematic view of the liquid discharge apparatus 10 according to the present embodiment, and FIG. 2 is a block diagram of the liquid discharge apparatus 10 according to the present embodiment.

Figure 2:
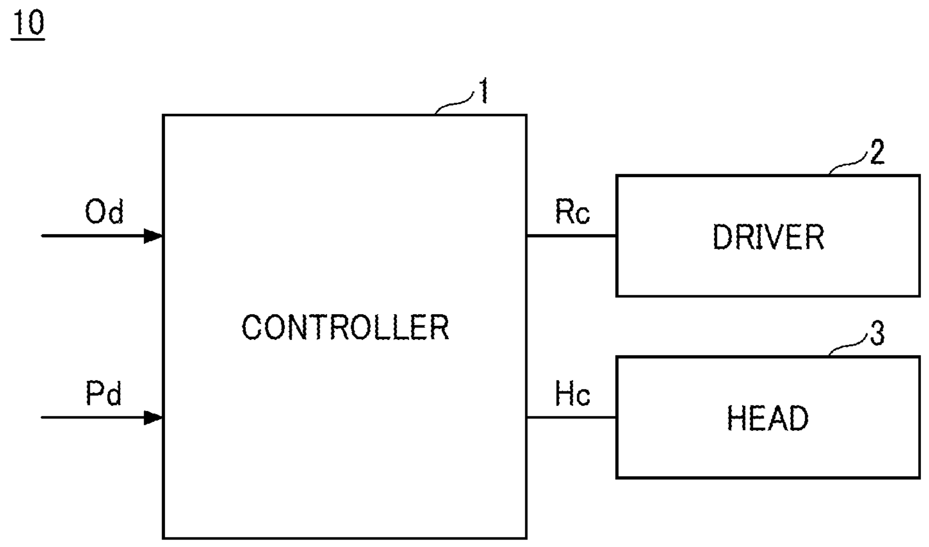
FIG. 2 is a block diagram of the liquid discharge apparatus according to embodiments of the present disclosure.

As illustrated in FIGS. 1 and 2, the liquid discharge apparatus 10 includes a controller 1, a driver 2, and a head 3. The liquid discharge apparatus 10 is a coating apparatus that applies a liquid discharged from the head 3 by an ink jet method to a surface of an object 200 to coat the surface of the object 200. Examples of the liquid include paint, ink, or the like.

The object 200 has an impermeable surface, such as a body of a car, a truck, or an aircraft. Here, the impermeable surface has a property of preventing a liquid applied to the surface of the object 200 from permeating into the interior. However, the surface of the object 200 is not limited to the impermeable surface and may be a permeable surface. In the present embodiment, the object 200 has a curved surface having a curvature but may has a flat surface.

Examples of the controller 1 include a personal computer (PC) or the like, which serves as a control apparatus that causes the head 3 to discharge a liquid. The controller 1 is connected to the driver 2 and the head 3 so as to communicate with each other via a wire or wirelessly. The controller 1 outputs a drive command Rc to the driver 2 so as to cause the driver 2 to move the head 3 and outputs a drive signal Hc to the head 3 so as to cause the head 3 to discharge a liquid based on shape data Od and coating area data Pd. The shape data Od is transmitted from an external device such as an external PC and indicates a shape of the object 200. The coating area data Pd indicates an area to be coated on the surface of the object 200.

Examples of the driver 2 includes a multi-axis drivable robot arm that relatively moves the head 3 and the object 200, in other words, moves at least one of the head 3 or the object 200 relative to the other of the head 3 or the object 200. The driver 2 holds the head 3 and moves the head 3 to a desired position in a three-dimensional space. The liquid discharge apparatus 10 causes the head 3 to discharge a liquid to a desired position on the object 200 while driving the driver 2. The driver 2 is not limited to the robot arm and may include a stage that is linearly movable in three axial directions. The driver 2 may move the object 200 without moving the head 3, or may move both the head 3 and the object 200.

Configuration of Head

Figure 3:
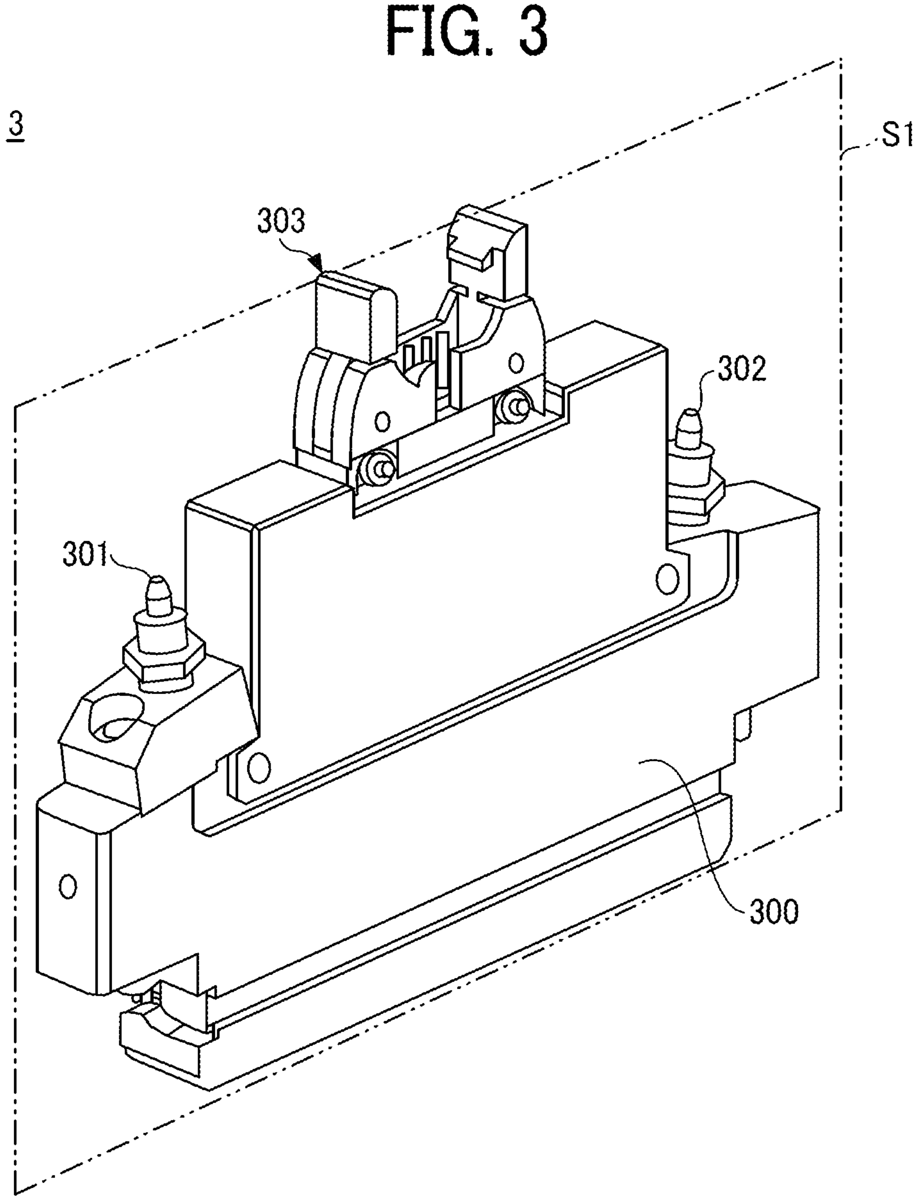
FIG. 3 is a perspective view of a head of the liquid discharge apparatus according to embodiments of the present disclosure.
Figure 4:
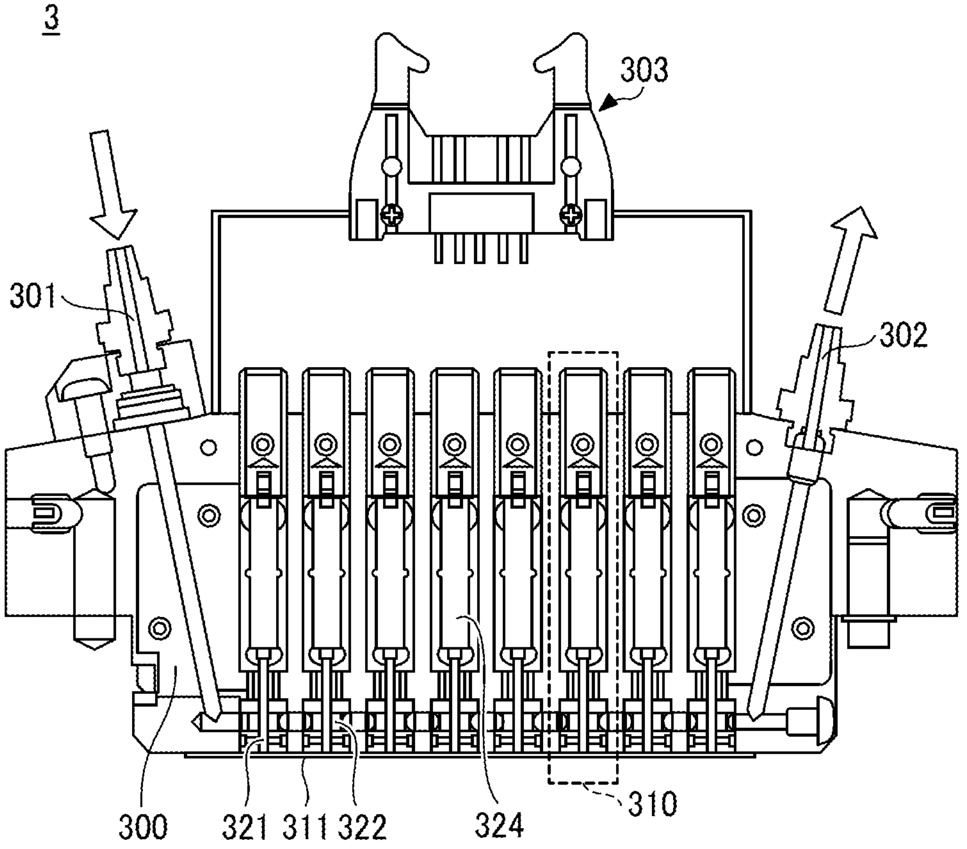
FIG. 4 is a cross-sectional view of the head taken along a plane S1 in FIG. 3.

FIG. 3 and FIG. 4 illustrate a configuration of the head 3. FIG. 3 is a perspective view of the head 3, and FIG. 4 is a cross-sectional view of the head 3 taken along a plane S1 in FIG. 3.

The head 3 includes multiple discharge modules 310 arranged in one row or a plurality of rows in a housing 300. The head 3 includes a supply port 301 and a collection port 302. A liquid pressurized from the outside is supplied to the discharge modules 310 through the supply port 301, and the liquid that is not discharged is drained to the outside through the collection port 302. The housing 300 includes a connector 303.

The discharge module 310 includes a nozzle plate 311 having a nozzle 321 from which a liquid is discharged, a channel 322 communicating with the nozzle 321, and a piezoelectric element 324 that drives a needle-shaped valve to open and close the nozzle 321. The pressurized liquid is fed through the channel 322.

The nozzle plate 311 is joined to the housing 300. The channel 322 is shared with the multiple discharge modules 310 in the housing 300. The pressurized liquid such as ink is supplied from the supply port 301 to the channel 322 and drained from the collection port 302. The discharge module 310 may temporarily stops draining a liquid from the collection port 302 while discharging the liquid to the object 200 from the nozzle 321 to prevent a decrease in a liquid discharge efficiency from the nozzle 321.

Figure 5A:
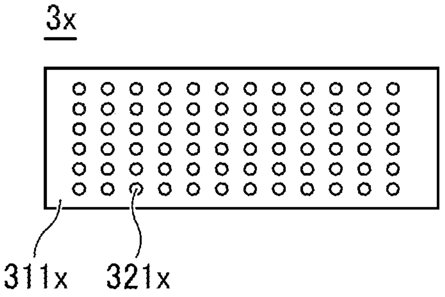
FIG. 5A is a plan view of the head of piezoelectric drive type.
Figure 5B:
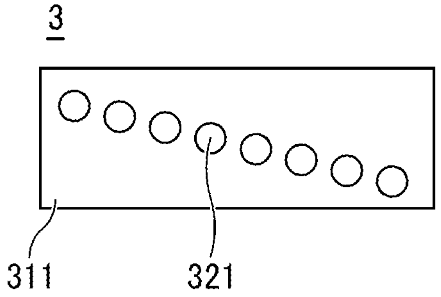
FIG. 5B is a plan view of the head of valve jet type.

The head 3 is a valve jet type that has multiple nozzles and individually opens and closes the multiple nozzles 321 to discharge the liquid from each of the multiple nozzles 321 to the object 200. FIG. 5A is a plan view of a head 3*x* of piezoelectric drive type, and FIG. 5B is a plan view of the head 3 of valve jet type as viewed in a direction in which the liquid is discharged.

In the head 3*x* of piezoelectric drive type, piezoelectric elements dynamically push out a liquid in a liquid chamber of the head 3x of piezoelectric drive type to discharge the liquid from nozzles 321x formed in a nozzle plate 311x. Since the head 3x uses the piezoelectric elements, many nozzles 321x can be formed in the nozzle plate 311x with high density, and a high-resolution image pattern can be drawn with high quality.

In the head 3 of valve jet type, a liquid in the channel 322 (liquid chamber) of the head 3 is kept at high pressure, and the valve of each nozzle 321 is opened and closed to discharge the liquid. The head 3 has fewer nozzles per head and discharges a larger amount of liquid from one nozzle than the head 3x of piezoelectric drive type. For this reason, the head 3 can reliably control each of the nozzles as compared with the head 3x of piezoelectric drive type. In the present embodiment, the liquid discharge apparatus 10 includes, but not limited to, the head 3 of valve jet type, and may include the head 3x of piezoelectric drive type.

Configuration of Controller

Example of Hardware Configuration

Figure 6:
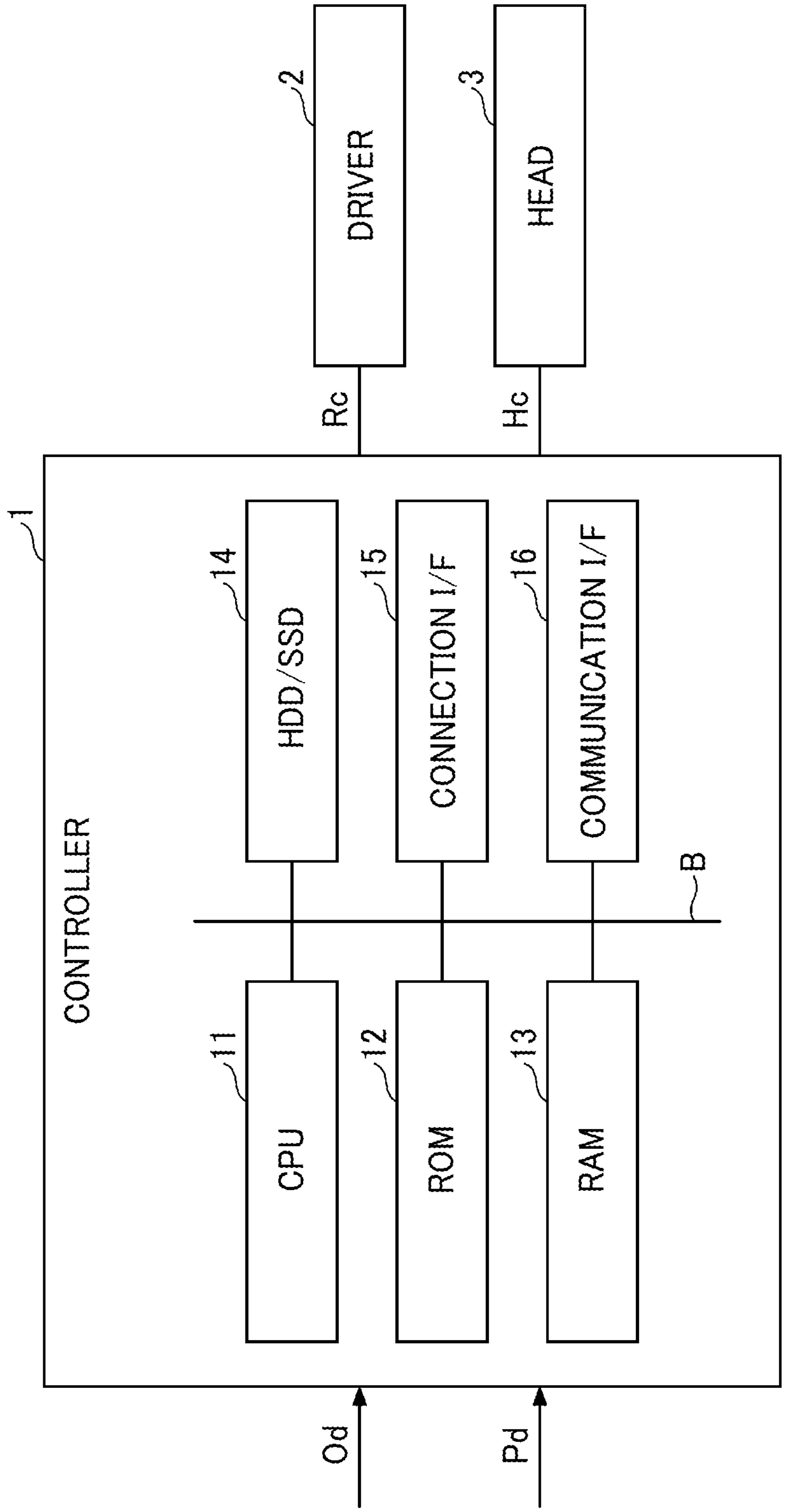
FIG. 6 is a block diagram illustrating a hardware configuration of a controller of the liquid discharge apparatus according to embodiments of the present disclosure.

FIG. 6 is a block diagram illustrating a hardware configuration of the controller 1. The controller 1 includes a central processing unit (CPU) 11, a read only memory (ROM) 12, a random access memory (RAM) 13, a hard disk drive (HDD)/solid state drive (SSD) 14, a connection interface (I/F) 15, and a communication I/F 16. These components are electrically connected to each other via a system bus B.

The CPU 11 uses the RAM 13 as a work area and executes a program stored in the ROM 12 to control the overall operation of the controller 1. The ROM 12 is a non-volatile memory that stores a program for controlling, for example, a recording operation to the CPU 11 and other fixed data. The RAM 13 is a volatile memory that temporarily stores various kinds of data.

The HDD/SSD 14 is a nonvolatile memory that stores the coating area data Pd, the shape data Od of the body of the object 200, and the like. The CPU 11 may read the data stored in the HDD/SSD 14 and uses the data to execute the program. The connection I/F 15 connects the controller 1 to an external equipment. Examples of the external equipment include the driver 2 and the head 3. The communication I/F 16 allows the controller 1 to communicate with the external device such as the external PC.

First Embodiment

Example of Functional Configuration of Controller

Figure 7:
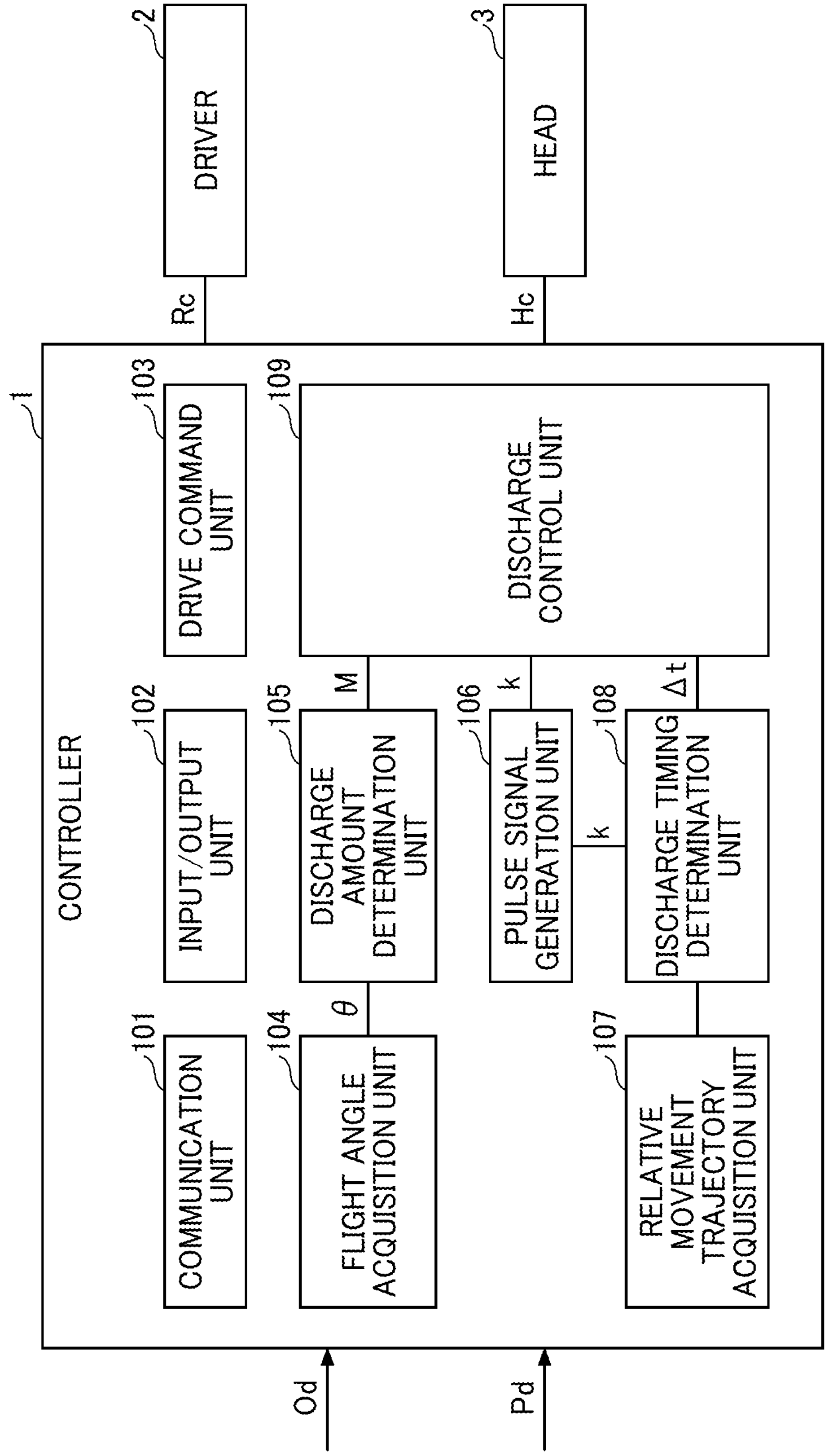
FIG. 7 is a block diagram illustrating a functional configuration of the controller according to a first embodiment.

FIG. 7 is a block diagram illustrating a functional configuration of the controller 1 according to a first embodiment. The controller 1 includes a communication unit 101, an input/output unit 102, a drive command unit 103, a flight angle acquisition unit 104, a discharge amount determination unit 105, a pulse signal generation unit 106, a relative movement trajectory acquisition unit 107, a discharge timing determination unit 108, and a discharge control unit 109.

The controller 1 implements functions of the communication unit 101 and the input/output unit 102 with the communication I/F 16 and the connection I/F 15, respectively. The controller 1 executes a program stored in the ROM 12 with the CPU 11 to implement the functions of the drive command unit 103, the flight angle acquisition unit 104, the discharge amount determination unit 105, the pulse signal generation unit 106, the relative movement trajectory acquisition unit 107, the discharge timing determination unit 108, and the discharge control unit 109.

Note that the controller 1 may include functional units other than those units described above. Components other than the controller 1 may have some of the above-described functions of the controller 1. Examples of the components other than the controller 1 include the driver 2, the head 3, and the external PC. The controller 1 and the components other than the controller 1 may be dispersed to implement some of the above-described functions of the controller 1. Alternatively, the controller 1 may implement at least a part of the functions to be implemented by the CPU 11 with an electric circuit such as an application specific integrated circuit (ASIC) or a field programmable gate array (FPGA).

The communication unit 101 controls communication of signals and data between the controller 1 and the external device such as the external PC. The input/output unit 102 controls input and output of signals and data between the controller 1, and the driver 2 and the head 3. The drive command unit 103 outputs the drive command Rc to the driver 2 to cause the driver 2 to move the head 3 relative to the object 200.

The flight angle acquisition unit 104 acquires, by calculation, data of a flight angle θ which is an angle formed between a flight direction of liquid discharged from each of the multiple nozzles 321 and a normal direction of the surface of the object 200. For example, the flight angle acquisition unit 104 acquires data of the normal direction at each position on the surface of the object 200 by calculation based on the shape data Od of the object 200 having a curved surface. Then, the flight angle acquisition unit 104 calculates the angle formed between the flight direction of the liquid and the normal direction of the surface of the object 200, thereby acquiring the data of the flight angle θ.

The discharge amount determination unit 105 determines an amount of liquid discharged from each of the multiple nozzles 321 (i.e., a liquid discharge amount M) based on the flight angle θ acquired by the flight angle acquisition unit 104, and outputs the liquid discharge amount M to the discharge control unit 109.

The pulse signal generation unit 106 generates a pulse signal k serving as a reference of a timing at which liquid is discharged from each of the multiple nozzles 321 based on a distance of relative movement between the head 3 and the object 200 by the driver 2 (i.e., a relative movement distance), and outputs the pulse signal k to the discharge timing determination unit 108 and the discharge control unit 109. For example, the pulse signal generation unit 106 generates the pulse signal k based on a detection signal output by a detector such as a rotary encoder or an acceleration sensor of the driver 2 in response to the operation of the driver 2. The timing at which the pulse signal k is generated may be determined in advance based on an operation simulation of the driver 2.

The relative movement trajectory acquisition unit 107 acquires data of a trajectory of relative movement between the object 200 and the head 3 (i.e., a relative movement trajectory) by calculation based on the coating area data Pd.

The discharge timing determination unit 108 determines a liquid discharge timing Δt based on a target distance between the object 200 and each of the multiple nozzles 321, and outputs the liquid discharge timing Δt to the discharge control unit 109. For example, the discharge timing determination unit 108 acquires data of the target distance at each of division points by calculation. The division points divide the relative movement trajectory at discharge intervals between discharge positions, at which a liquid is discharged from each of the multiple nozzles 321, in a direction of relative movement between the multiple nozzles 321 and the object 200 (i.e., a relative movement direction). The discharge timing determination unit 108 determines the liquid discharge timing Δt based on the target distance.

The discharge control unit 109 outputs the drive signal Hc to the head 3 based on the coating area data Pd, the pulse signal k, the liquid discharge amount M, and the liquid discharge timing Δt to cause the head 3 to discharge the liquid from each of the multiple nozzles 321.

Figure 8A:
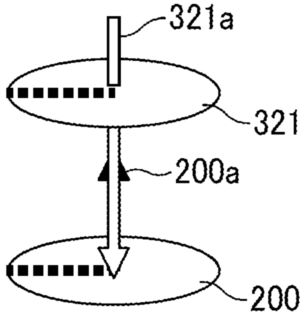
FIG. 8A is a diagram of a flight direction and a normal direction when a flight angle is 0 degrees, illustrating a method of determining a liquid discharge amount according to the first embodiment.
Figure 8B:
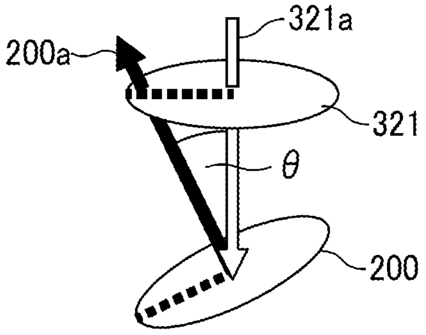
FIG. 8B is a diagram of the flight direction and the normal direction when the flight angle is θ, illustrating the method of determining the liquid discharge amount according to the first embodiment.

Method of Determining Liquid Discharge Amount M According to First Embodiment FIG. 8A is a diagram of the flight direction and the normal direction when the flight angle is 0 degrees, illustrating a method of determining the liquid discharge amount M according to the first embodiment. FIG. 8B is a diagram of the flight direction and the normal direction when the flight angle is θ, illustrating the method of determining the liquid discharge amount M according to the first embodiment. In FIGS. 8A and 8B, the liquid is discharged from one nozzle 321 of the head 3 in the direction of gravity.

The discharged liquid flies in a flight direction 321*a*, and a normal direction 200*a* is normal (orthogonal) to the surface of the object 200. In the examples illustrated in FIGS. 8A and 8B, the flight direction 321*a* coincides with the direction of gravity.

In FIG. 8A, the normal direction 200*a* coincides with the direction of gravity, and the flight angle θ is 0 degrees. On the other hand, in FIG. 8B, the normal direction 200*a* is inclined by the flight angle θ with respect to the direction of gravity. When the normal direction 200*a* is inclined, the liquid that has landed on the surface of the object 200 may move on the surface of the object 200 under gravity. The amount of liquid that moves on the surface of the object 200 increases as the flight angle θ increases. If the liquid moves, the thickness of the film formed on the surface of the object 200 may change, causing coating unevenness. In the present embodiment, the discharge amount determination unit 105 determines the liquid discharge amount M according to the following Equation 1 to correct the film thickness to be changed due to the movement of the liquid.

$$M=M_0/\cos^2\theta \qquad \text{Equation 1,}$$

where $M_0$ represents the liquid discharge amount when the flight angle θ is 0 degrees.

Figure 9A:
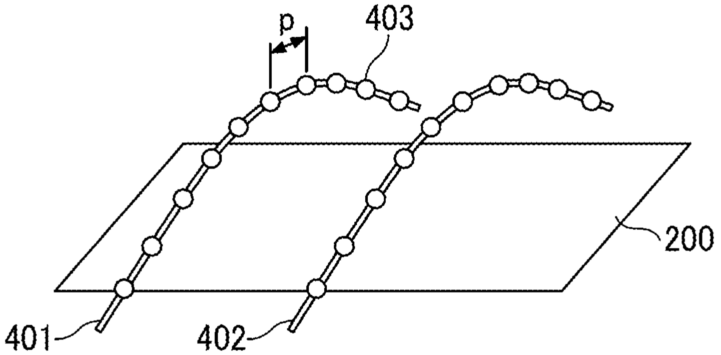
FIG. 9A is a diagram of a relative movement trajectory divided at discharge intervals, illustrating a method of determining a liquid discharge timing according to the first embodiment.
Figure 9B:
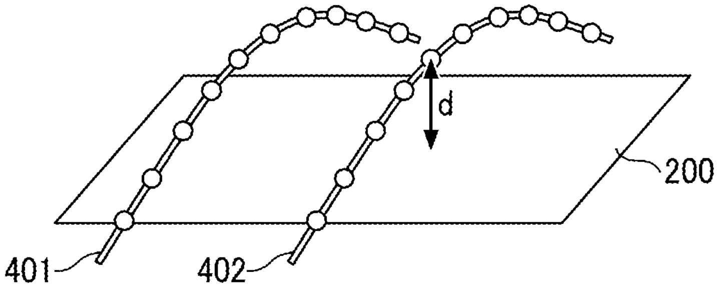
FIG. 9B is a diagram of the relative movement trajectory and a target distance, illustrating the method of determining the liquid discharge timing according to the first embodiment.

Method of Determining Liquid Discharge Timing Δt According to First Embodiment FIG. 9A is a diagram of the relative movement trajectory divided at discharge intervals, illustrating a method of determining the liquid discharge timing Δt according to the first embodiment. FIG. 9B is a diagram of the relative movement trajectory and the target distance, illustrating the method of determining the liquid discharge timing Δt according to the first embodiment. FIGS. 9A and 9B illustrate relative movement trajectories 401 and 402, each of which arcs, of two nozzles 321 among the multiple nozzles 321.

As illustrated in FIG. 9A, the discharge timing determination unit 108 divides each of the relative movement trajectories 401 and 402 at discharge intervals p. Then, as illustrated in FIG. 9B, when the nozzle 321 is positioned at each of division points 403 that divides the relative movement trajectories 401 and 402, the discharge timing determination unit 108 calculates a target distance d between the nozzle 321 and the object 200, and divides the target distance d by a predetermined speed of the liquid discharged from the nozzle 321 (i.e., a liquid discharge speed Vh). As a result, the discharge timing determination unit 108 can calculate a landing time from when the liquid is discharged from the nozzle 321 to when the liquid lands on the surface of the object 200.

Next, the discharge timing determination unit 108 subtracts the landing time from the time when the nozzle 321 is positioned at each of the division points 403 to obtain a discharge start time. The discharge timing determination unit 108 compares the discharge start time with the pulse signal k to determine the liquid discharge timing Δt. As described above, the controller 1 determines the liquid discharge timing Δt based on the target distance d.

The pulse signal k is generated each time the nozzle 321 moves a certain distance shorter than the discharge interval p (e.g., half of the discharge interval p). The head 3 discharges the liquid once at maximum from the nozzle 321 in response to one pulse signal k. Even when the pulse signal k is generated, the head 3 may not discharge the liquid from the nozzle 321.

The reason why the pulse signal k is generated each certain distance shorter than the discharge interval p is that the head 3 includes the multiple nozzles 321. The pulse signal k is generated based on the distance of movement of the center of the driver 2. When the driver 2 moves the relative movement distance L_1(m) by the discharge intervals p(m), the controller 1 generates the pulse signal k of L_1/p times to achieve a desired discharge interval p.

When the head 3 includes the multiple nozzles 321, the relative movement distance is different for each of the multiple nozzles 321. For example, an end nozzle at the end of the multiple nozzles 321, which is away from the center of the multiple nozzles 321, moves the relative movement distance L_2(m) longer than the relative movement distance L 1 due to the difference of turning radius between the end and center of the multiple nozzles 321 when the head 3 moves so as to draw a curve. As a result, the controller 1 does not achieve the desired discharge interval p with the pulse signal k of L_1/p times for the end nozzle of the multiple nozzles 321. For example, the head 3 discharges the liquid from the end nozzle of the multiple nozzles 321 at the average discharge interval (L_2/L_1)×p, which is longer than the discharge interval p. In such a case, the controller 1, for example, generates the pulse signal k every time the driver 2 relatively moves a distance of 0.5 times the discharge interval p. As a result, the controller 1 achieves the desired discharge interval p unless the relative movement distance L_2 is longer than 2 times the relative movement distance L_1.

Example of Process Executed by Controller

Figure 10A:
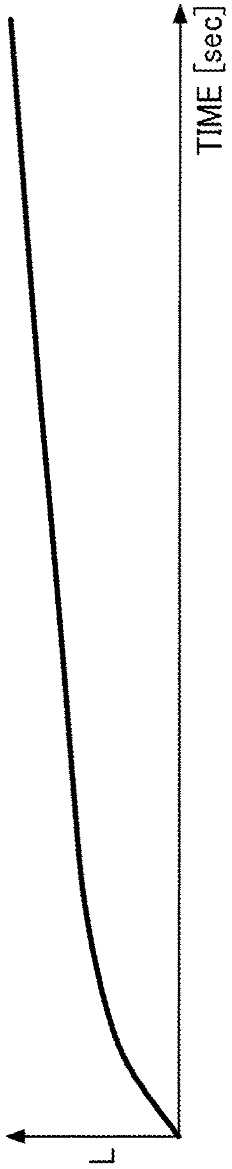
FIG. 10A is a timing chart illustrating a relative movement distance in a process executed by the controller according to the first embodiment.
Figure 10B:
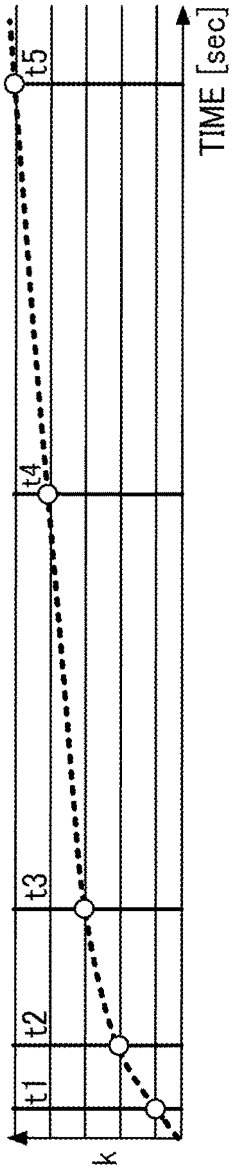
FIG. 10B is a timing chart illustrating a pulse signal in the process executed by the controller according to the first embodiment.
Figure 10C:
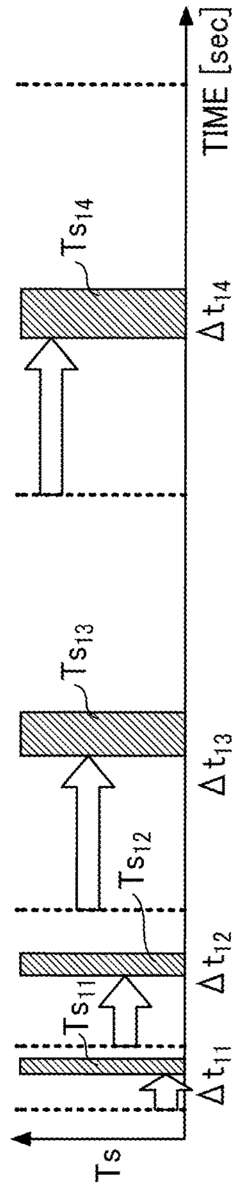
FIG. 10C is a timing chart illustrating a liquid discharge timing of one nozzle in the process executed by the controller according to the first embodiment.
Figure 10D:
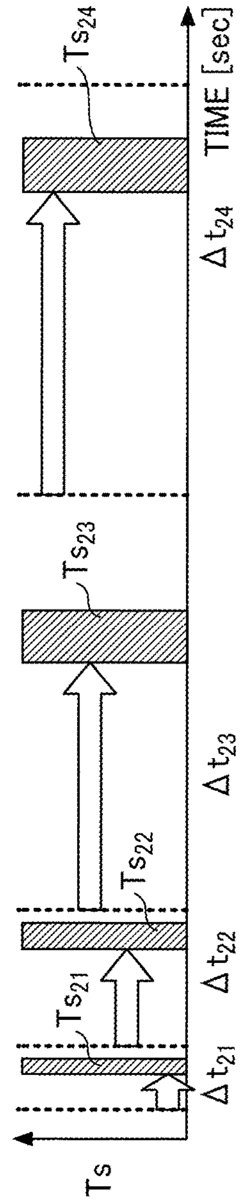
FIG. 10D is a timing chart illustrating a liquid discharge timing of another nozzle in the process executed by the controller according to the first embodiment.

FIGS. 10A to 10D are timing charts of a process executed by the controller 1. FIG. 10A is a graph of the relative movement distance L of the head 3, FIG. 10B is a chart of the pulse signal k, FIG. 10C is a chart of the liquid discharge timing of a first nozzle among the multiple nozzles 321, and FIG. 10D is a chart of the liquid discharge timing of a second nozzle among the multiple nozzles 321. The time axes in FIGS. 10A to 10D correspond to each other.

When the head 3 relatively moves as illustrated in FIG. 10A, the pulse signal k is generated at predetermined times t1, t2, t3, t4 and t5 as illustrated in FIG. 10B. As illustrated in FIG. 10C, the controller 1 determines the liquid discharge timing $\Delta t_{11}$ corresponding to the pulse signal k at the time t1, the liquid discharge timing $\Delta t_{12}$ corresponding to the pulse signal k at the time t2, the liquid discharge timing $\Delta t_{13}$ corresponding to the pulse signal k at the time t3, the liquid discharge timing $\Delta t_{14}$ corresponding to the pulse signal k at the time t4, and the liquid discharge timing $\Delta t_{15}$ corresponding to the pulse signal k at the time t5 to generate a timing signal Ts indicating each timing for the first nozzle of the multiple nozzle 321.

Liquid discharge periods $Ts_{11}$ to $Ts_{14}$ in FIG. 10C correspond to the liquid discharge amounts corresponding to the timing signal Ts at times t1, t2, t3, t4, and t5, respectively. The width of a high state of the timing signal Ts indicates the period during which the liquid is discharged. The longer period of the high state indicates the larger liquid discharge amount. That is, the liquid discharge amount Mu corresponds to the liquid discharge period $Ts_{11}$, the liquid discharge amount $M_{12}$ corresponds to the liquid discharge period $Ts_{12}$, the liquid discharge amount $M_{13}$ corresponds to the liquid discharge period $Ts_{13}$, and the liquid discharge amount $M_{14}$ corresponds to the liquid discharge period $Ts_{14}$. These liquid discharge amounts M satisfies a relation of $M_{11}<M_{12}<M_{13}<M_{14}$ in FIG. 10C.

As illustrated in FIG. 10D, the controller 1 determines the liquid discharge timing $\Delta t_{21}$ corresponding to the pulse signal k at the time t1, the liquid discharge timing $\Delta t_{22}$ corresponding to the pulse signal k at the time t2, the liquid discharge timing $\Delta t_{23}$ corresponding to the pulse signal k at the time t3, the liquid discharge timing $\Delta t_{24}$ corresponding to the pulse signal k at the time t4, and the liquid discharge timing $\Delta t_{25}$ corresponding to the pulse signal k at the time t5 to generate a timing signal Ts indicating each timing for the second nozzle of the multiple nozzle 321.

Liquid discharge periods $Ts_{21}$ to $Ts_{24}$ in FIG. 10D correspond to the liquid discharge amounts corresponding to the timing signal Ts at times t1, t2, t3, t4, and t5, respectively. The liquid discharge amount $M_{21}$ corresponds to the liquid discharge period $Ts_{21}$, the liquid discharge amount $M_{22}$ corresponds to the liquid discharge period $Ts_{22}$, the liquid discharge amount $M_{23}$ corresponds to the liquid discharge period $Ts_{23}$, and the liquid discharge amount $M_{24}$ corresponds to the liquid discharge period $Ts_{24}$. These liquid discharge amounts M satisfies a relation of $M_{21}<M_{22}<M_{23}<M_{24}$ in FIG. 10D.

Since the pulse signal k is generated in accordance with the movement of the head 3, the timing to generate the pulse signal k is common to all of the multiple nozzles 321. In the present embodiment, the controller 1 determines a delay time from one pulse signal k as the liquid discharge timing Δt for each of the multiple nozzles 321. Accordingly, the head 3 discharges the liquid from each of the multiple nozzles 321 after waiting the determined liquid discharge timing Δt from the one pulse signal k.

Figure 11:
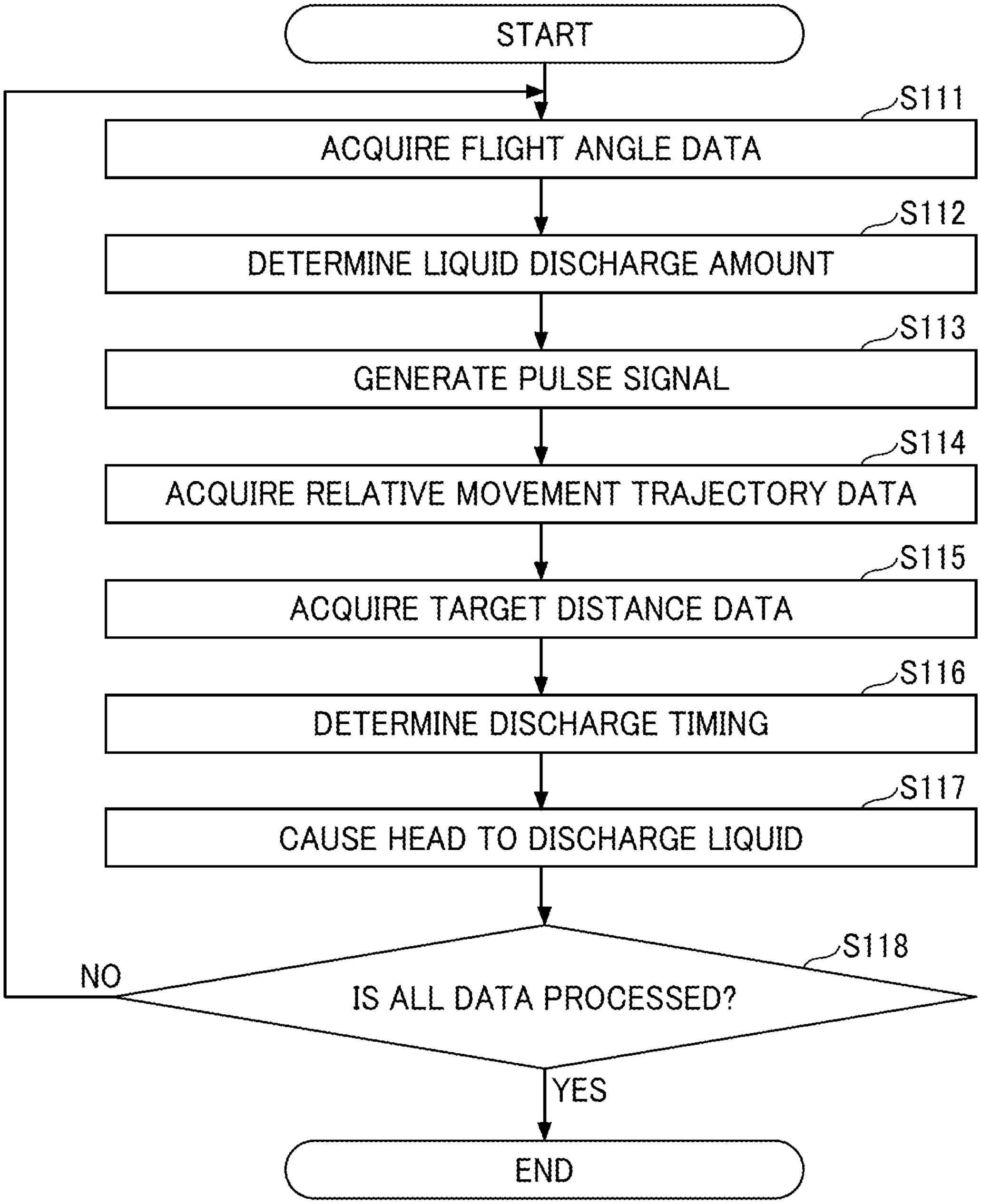
FIG. 11 is a flowchart illustrating an example of the process executed by the controller according to the first embodiment.

FIG. 11 is a flowchart of a process executed by the controller 1. For example, the controller 1 starts the process illustrated in FIG. 11 at a timing when the shape data Od and the coating area data Pd are input from the external PC.

In step S111, the controller 1 causes the flight angle acquisition unit 104 to acquire data of the normal direction 200*a* by calculation based on the shape data Od of the object 200 and to calculate the angle between the flight direction 321*a* of the liquid and the normal direction 200*a*, thereby acquiring the flight angle θ.

In step S112, the controller 1 causes the discharge amount determination unit 105 to determine data of the liquid discharge amount M discharged from each of the multiple nozzles 321 by calculation based on the flight angle θ acquired by the flight angle acquisition unit 104, and outputs the data of the liquid discharge amount M to the discharge control unit 109.

In step S113, the controller 1 causes the pulse signal generation unit 106 to generate the pulse signal k serving as the reference of the timing at which a liquid is discharged from each of the multiple nozzles 321 in accordance with the relative movement distance L between the head 3 and the object 200 by the driver 2, and outputs the pulse signal k to the discharge timing determination unit 108 and the discharge control unit 109.

In step S114, the controller 1 causes the relative movement trajectory acquisition unit 107 to acquire data of the relative movement trajectory between the object 200 and the head 3 by calculation based on the coating area data Pd.

In step S115, the controller 1 causes the discharge timing determination unit 108 to acquire data of the target distance d by calculation at each division point 403 that divides the relative movement trajectory by the discharge intervals p for each of the multiple nozzles 321.

In step S116, the controller 1 determines the liquid discharge timing Δt based on the target distance d.

In step S117, the controller 1 causes the discharge control unit 109 to output the drive signal Hc to the head 3 based on the coating area data Pd, the pulse signal k, the liquid discharge amount M, and the liquid discharge timing Δt to cause the head 3 to discharge a liquid from each of the multiple nozzles 321.

In step S118, the controller 1 determines whether to end the process. For example, the controller 1 determines to end the process based on whether the process has been executed based on all of the shape data Od or the coating area data Pd.

When the controller 1 determines to end the process in step S118 (Yes in step S118), the process ends. When the controller 1 determines not to end the process in step S118 (No in step S118), the controller 1 continues the process from step S111 again. As described above, the controller 1 causes the head 3 to discharge a liquid based on the shape data Od and the coating area data Pd.

Effects of Liquid Discharge Apparatus

As described above, the liquid discharge apparatus 10 includes the head 3, the driver 2, and the controller 1. The controller 1 determines the liquid discharge amount M based on the flight angle θ between the flight direction 321*a* of the liquid discharged from each of the multiple nozzles 321 and the normal direction 200*a* of the surface of the object 200 for each of the multiple nozzles 321. For example, the controller 1 determines the liquid discharge amount M at the flight angle θ by Equation 1 described above.

When the object 200 has a curved surface and the surface of the object 200 is inclined, the liquid landed on the surface of the object 200 may move under gravity. If the liquid moves, the thickness of the film formed on the surface of the object 200 may change, causing coating unevenness. In the present embodiment, the controller 1 determines the liquid discharge amount M based on the flight angle θ. Accordingly, for example, the controller 1 can increase the liquid discharge amount M to an area of the surface on which the film having a small film thickness is to be formed due to the movement of the liquid. As a result, the controller 1 can correct the film thickness of the film to be formed on the surface of the object 200, and thus the liquid discharge apparatus 10 that forms a film having good uniformity can be provided.

In the present embodiment, the controller 1 determines the liquid discharge timing Δt based on the target distance d. For example, the controller 1 determines the liquid discharge timing Δt based on the target distance d at each division point that divides the relative movement trajectory between the nozzle 321 and the object 200 by the discharge intervals p.

When the object 200 has a curved surface, the target distance d is different for each of the multiple nozzles 321. Since the head 3 and the object 200 move relative to each other, the landing position of the liquid on the surface of the object 200 deviates from a desired position due to the difference in the target distance d. In the present embodiment, the controller 1 determines the liquid discharge timing Δt to change the landing position for each of the multiple nozzles 321 based on the target distance d, thereby reducing the deviation of the landing position described above. Accordingly, the liquid can be landed at a desired position on the surface of the object 200, and a desired film having good uniformity can be formed on the surface of the object 200.

In the present embodiment, the head 3 individually opens and closes multiple nozzles 321 to discharge a liquid from each of the multiple nozzles 321 to the object 200. The head 3 has fewer nozzles per head and can discharge a larger amount of liquid from one nozzle than the head of piezoelectric drive type. Accordingly, the controller 1 can individually control the multiple nozzles 321 to efficiently form a film on the object 200.

In the present embodiment, the liquid discharge apparatus 10 is described. However, the same effects as that of the liquid discharge apparatus 10 apply to a control apparatus including the function of the controller 1 and a liquid discharge system including the control apparatus, the driver 2, and a liquid discharge apparatus including the head 3.

Second Embodiment

A controller 1*a* according to a second embodiment is described below. The same components as those of the first embodiment are denoted by the same reference numerals, and redundant description thereof is appropriately omitted.

Figure 12:
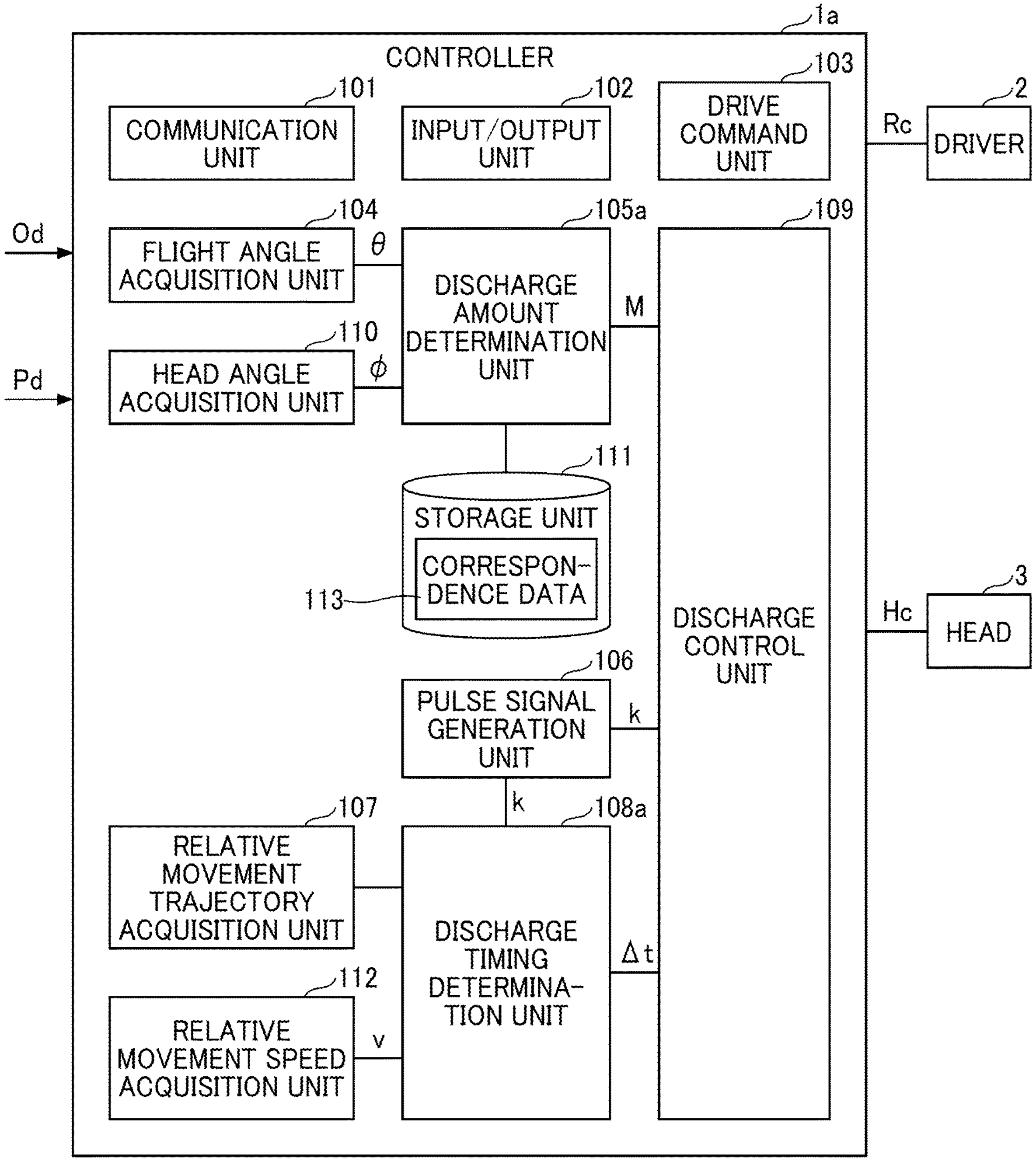
FIG. 12 is a block diagram illustrating a functional configuration of the controller according to a second embodiment.

FIG. 12 is a block diagram illustrating an example of the functional configuration of the controller 1*a*. The controller 1*a* further includes a head angle acquisition unit 110, a storage unit 111, a discharge amount determination unit 105*a*, a relative movement speed acquisition unit 112, and a discharge timing determination unit 108*a*.

The controller 1*a* implements a function of the storage unit 111 with the HDD/SSD 14. The controller 1*a* executes a program stored in the ROM 12 with the CPU 11 to implement functions of the head angle acquisition unit 110, the discharge amount determination unit 105*a*, the relative movement speed acquisition unit 112, and the discharge timing determination unit 108*a*.

Note that components other than the controller 1*a* may have some of the above-described functions of the controller 1*a*, or the controller 1*a* and the components other than the controller 1 may be dispersed to implement some of the above-described functions of the controller 1*a*. Alternatively, the controller 1*a* may implement at least a part of the functions to be implemented by the CPU 11 with an electric circuit such the ASIC or the FPGA.

The head angle acquisition unit 110 acquires, by calculation, data of a head angle which is an angle formed between the flight direction 321*a* of the liquid discharged from the nozzle 321 to be changed by the driver 2 and the direction of gravity. For example, the head angle acquisition unit 110 acquires data of the head angle φ based on a detection signal output from the detector such as the rotary encoder of the driver 2.

The storage unit 111 stores correspondence data 113 that is information indicating a correspondence between the flight angle θ, the target distance d, and the head angle φ or information related to the correspondence. The correspondence data 113 can be determined in advance by a preliminary experiment or the like.

The discharge amount determination unit 105*a* determines the liquid discharge amount M based on the flight angle θ, the target distance d of each of the multiple nozzles 321, and the head angle q, and outputs the liquid discharge amount M to the discharge control unit 109. For example, the discharge amount determination unit 105*a* determines the liquid discharge amount M with reference to the correspondence data 113 stored in the storage unit 111.

The relative movement speed acquisition unit 112 acquires data of a speed of relative movement between the head 3 and the object 200 (i.e., a relative movement speed v) by calculation. The relative movement speed acquisition unit 112 acquires the data of the relative movement speed v based on a detection signal output from the detector such as the rotary encoder of the driver 2.

The discharge timing determination unit 108*a* determines the liquid discharge timing Δt based on the target distance d and the relative movement speed v between the head 3 and the object 200, and outputs the liquid discharge timing Δt to the discharge control unit 109.

Method of Determining Liquid Discharge Amount M according to Second Embodiment.

FIG. 13 is a table of the correspondence data 113, illustrating a method of determining the liquid discharge amount M according to the second embodiment. In FIG. 13, the liquid discharge amount M for each head angle φ is illustrated as a row, and the liquid discharge amount for each of the target distance d and the flight angle θ is illustrated as a column. In the table illustrated in FIG. 13, A1_1, A2_1, . . . , C4_13, and C5_13 each represent the liquid discharge amount M.

The discharge amount determination unit 105*a* determines the liquid discharge amount M with reference to the correspondence data 113 based on the input head angle φ, target distance d, and flight angle θ. In this case, the liquid discharge amount M can be determined more precisely with the high-resolution of each of the head angle φ, the target distance d, and the flight angle θ, but on the other hand, the data amount of the correspondence data 113 increases. For this reason, the discharge amount determination unit 105*a* preferably interpolates the liquid discharge amount M beyond the resolution of each of the head angle φ, the target distance d, and the flight angle θ by interpolation calculation or the like. Examples of the calculation is described below.

For example, the liquid discharge amount M is acquired when the target distance d is 13 (mm), the flight angle θ is 35 (degrees), and the head angle φ is 50 (degrees) as follows.

The discharge amount determination unit 105*a* calculates the liquid discharge amount $M_{11}$ when the target distance d is 10 (mm), the flight angle θ is 30 (degrees), and the head angle φ is 50 (degrees) by the following equation.

$$M_{11}=\{1-(60-50)/(60-45)\}\times A3\_4+(60-50)/(60-45)\times A3\_5$$

The discharge amount determination unit 105*a* calculates the liquid discharge amount $M_{12}$ when the target distance d is 10 (mm), the flight angle θ is 45 (degrees), and the head angle φ is 50 (degrees) by the following equation.

$$M_{12}=\{1-(60-50)/(60-45)\}\times A4\_4+(60-50)/(60-45)\times A4\_5$$

The discharge amount determination unit 105*a* calculates the liquid discharge amount $M_{13}$ when the target distance d is 20 (mm), the flight angle θ is 30 (degrees), and the head angle φ is 50 (degrees) by the following equation.

$$M_{13}=\{1-(60-50)/(60-45)\}\times B3\_4+(60-50)/(60-45)\times B3\_5$$

The discharge amount determination unit 105*a* calculates the liquid discharge amount $M_{14}$ when the target distance d is 20 (mm), the flight angle θ is 45 (degrees), and the head angle φ is 50 (degrees) by the following equation.

$$M_{14}=\{1-(60-50)/(60-45)\}\times B4\_4+(60-50)/(60-45)\times B4\_5$$

The discharge amount determination unit 105*a* calculates the liquid discharge amount $M_{21}$ when the target distance d is 10 (mm), the flight angle θ is 35 (degrees), and the head angle φ is 50 (degrees) by the following equation.

$$M_{21}=\{1-(35-30)/(45-30)\}\times M_{11}+(35-30)/(45-30)\times M_{12}$$

The discharge amount determination unit 105*a* calculates the liquid discharge amount $M_{22}$ when the target distance d is 20 (mm), the flight angle θ is 35 (degrees), and the head angle φ is 50 (degrees) by the following equation.

$$M_{22}=\{1-(35-30)/(45-30)\}\times M_{13}+(35-30)/(45-30)\times M_{14}$$

Finally, the discharge amount determination unit 105*a* calculates the liquid discharge amount M when the target distance d is 13 (mm), the flight angle θ is 35 (degrees), and the head angle φ is 50 (degrees) by the following equation.

$$M=\{1-(13-10)/(20-10)\}\times M_{21}+(13-10)/(20-10)\times M_{22}$$

As described above, the discharge amount determination unit 105*a* determines the liquid discharge amount M beyond the resolution of each of the head angle φ, the target distance d, and the flight angle θ by the interpolation calculation.

Method of Determining Liquid Discharge Timing Δt according to Second Embodiment.

Figure 14A:
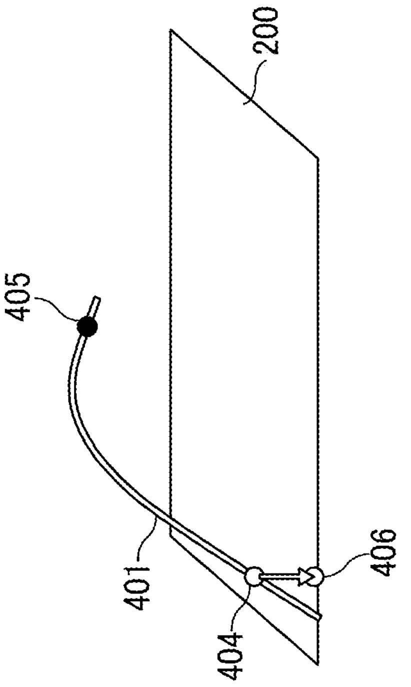
FIG. 14A is a diagram of a relative movement start position and a relative movement end position on the relative movement trajectory, illustrating a method of determining a liquid discharge timing according to the second embodiment.
Figure 14B:
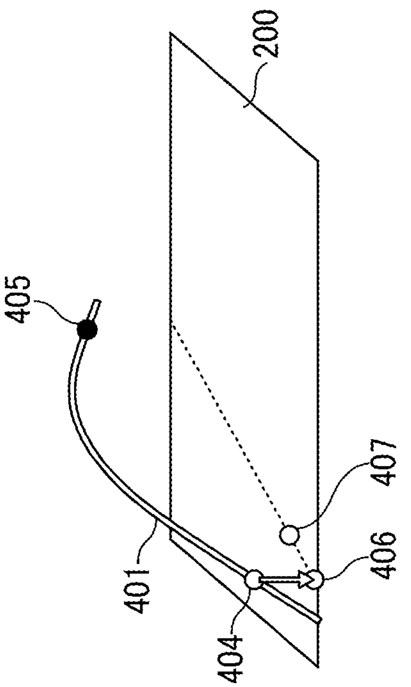
FIG. 14B is a diagram of a start landing position and a desired next landing position on the object, illustrating the method of determining the liquid discharge timing according to the second embodiment.
Figure 14C:
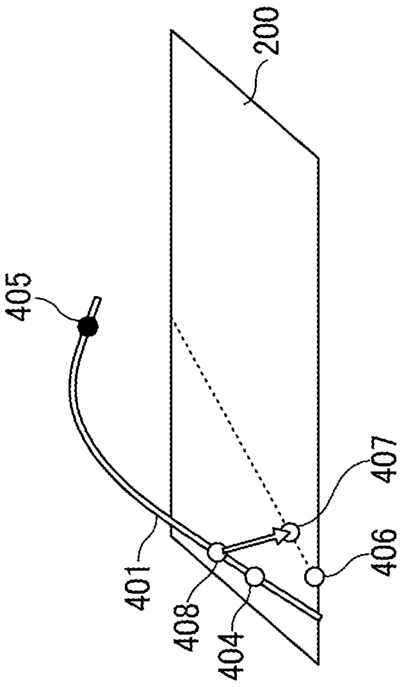
FIG. 14C is a diagram of a position of a desired nozzle on the relative movement trajectory, illustrating the method of determining the liquid discharge timing according to the second embodiment.
Figure 14D:
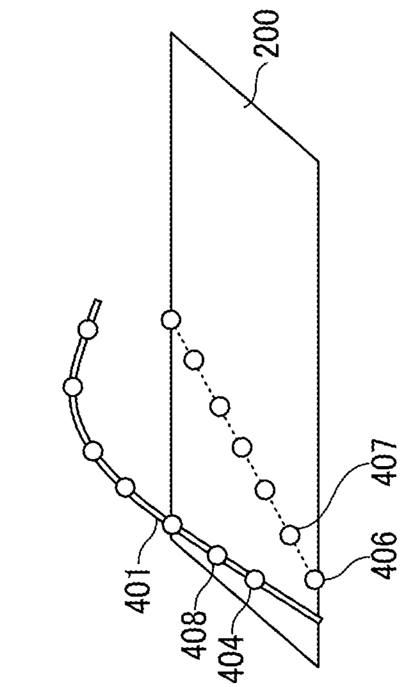
FIG. 14D is a diagram of landing positions on the object and positions of the corresponding nozzle, illustrating the method of determining the liquid discharge timing according to the second embodiment.

FIGS. 14A to 14D are diagrams of the relative movement trajectory, illustrating a method of determining the liquid discharge timing Δt according to the second embodiment. FIG. 14A is a diagram of a relative movement start position and a relative movement end position on the relative movement trajectory. FIG. 14B is a diagram of a start landing position and a desired next landing position on the object. FIG. 14C is a diagram of a position of a desired nozzle on the relative movement trajectory. FIG. 14D is a diagram of landing positions on the object.

When the relative movement speed v between the head 3 and the object 200 is high, an error of the liquid discharge timing Δt determined by the discharge timing determination unit 108 may become large. In the second embodiment, the discharge timing determination unit 108*a* determines the liquid discharge timing Δt based on the target distance d and the relative movement speed v.

When the relative movement speed v is high, a velocity vector of a liquid flying toward the object 200 is represented by a composite vector of the velocity vector of the discharged liquid and the velocity vector of the relative movement between the head 3 and the object 200. The discharge timing determination unit 108*a* can determine the liquid discharge timing Δt based on the head angle φ in addition to the target distance d and the relative movement speed v, thereby reducing the deviation of the landing position due to gravity.

As illustrated in FIG. 14A, the controller 1 determines a relative movement start position 404 and a relative movement end position 405 on the relative movement trajectory 401 of the nozzle 321. The controller calculates a start landing position 406 on the surface of the object 200, onto which the liquid discharged from the relative movement start position 404 lands. As illustrated in FIG. 14B, the controller 1 calculates a desired next landing position 407 shifted by the discharge interval p in the relative movement direction.

As illustrated in FIG. 14C, the controller 1 specifies a desired nozzle 408 that can discharge the liquid onto the desired next landing position 407, and calculates the landing position of the liquid discharged from the desired nozzle 408. In this case, the controller 1 calculates the landing position based on a flight trajectory of the liquid in consideration of the relative movement speed v combined with the liquid discharge speed Vh. Thus, the controller 1 compares the time at the landing position and the pulse signal k to determine the liquid discharge timing Δt.

Example of Process Executed by Controller

Figure 15:
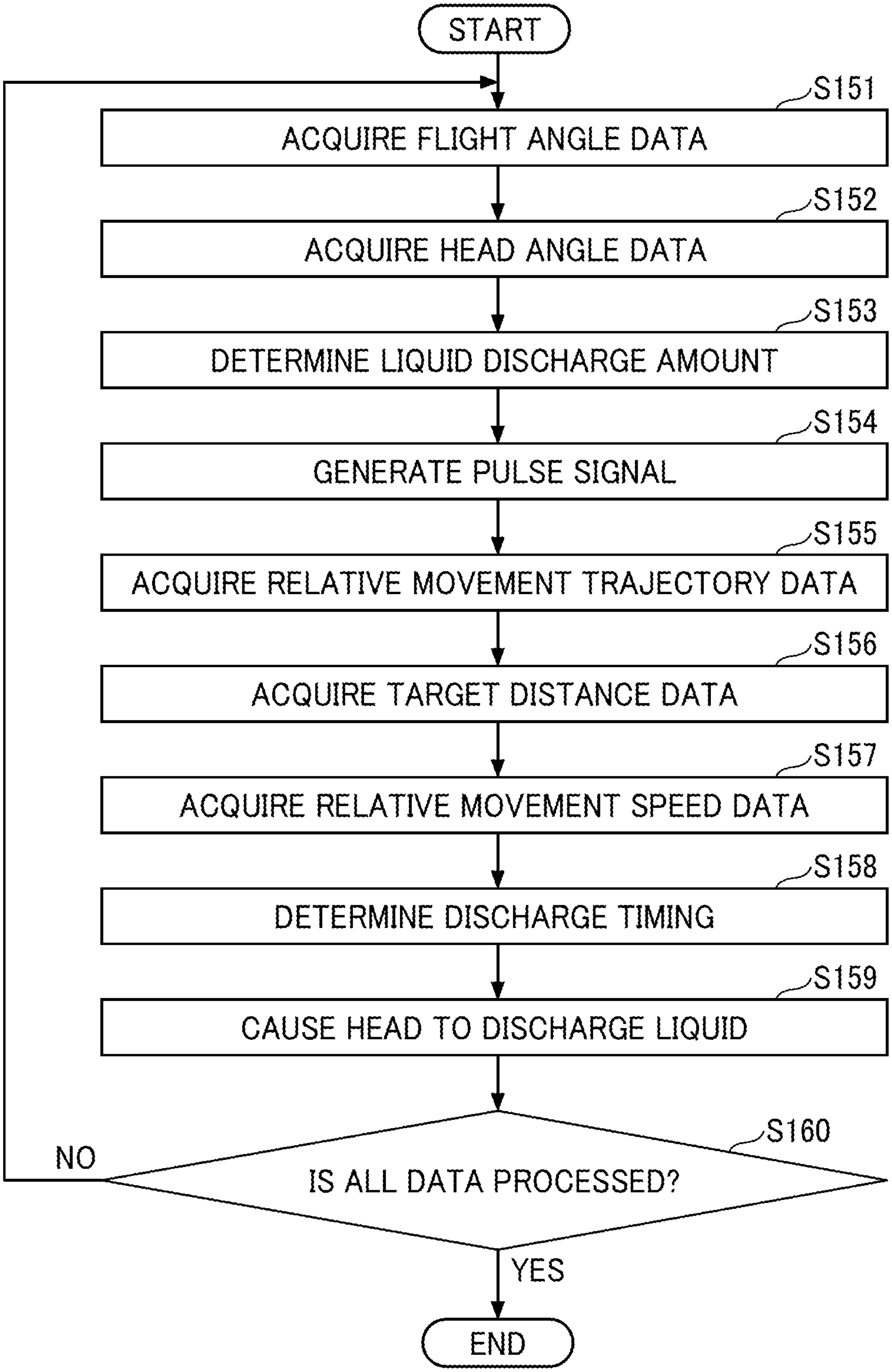
FIG. 15 is a flowchart illustrating an example of the process executed by the controller according to the second embodiment.

FIG. 15 is a flowchart of a process executed by the controller 1*a*. For example, the controller 1*a* starts the process illustrated in FIG. 15 at a timing when the shape data Od and the coating area data Pd are input from the external PC. Note that redundant description of steps that are the same steps as in the process illustrated in FIG. 11 is omitted as appropriate.

The step S151 is the same as the step S111 in FIG. 11. In step S152, the controller 1*a* causes the head angle acquisition unit 110 to acquire, by calculation, data of the head angle between the flight direction 321*a* of the liquid discharged from the nozzle 321 to be changed by the driver 2 and the direction of gravity.

In step S153, the controller 1*a* causes the discharge amount determination unit 105*a* to determine the liquid discharge amount M based on the flight angle θ, the target distance d of each of the multiple nozzles 321, and the head angle φ with reference to the correspondence data 113.

The steps S154 to S156 is the same as the steps S113 to S115 in FIG. 11. In step S157, the controller 1*a* causes the relative movement speed acquisition unit 112 to acquire data of a relative movement speed v between the head 3 and the object 200 by calculation.

In step S158, the controller 1*a* causes the discharge timing determination unit 108*a* to determine the liquid discharge timing Δt based on the target distance d and the relative movement speed v between the head 3 and the object 200.

The steps S159 and S160 is the same as the steps S117 and S118 in FIG. 11. As described above, the controller 1*a* causes the head 3 to discharge a liquid based on the shape data Od and the coating area data Pd.

Effects of Controller

As described above, in the present embodiment, the driver 2 changes the head angle φ between the flight direction 321*a* of the liquid discharged from each of the multiple nozzles 321 and the direction of gravity, and the controller 1*a* determines the liquid discharge amount M based on the flight angle θ, the target distance d of each of the multiple nozzles 321, and the head angle φ for each of the multiple nozzles 321. Accordingly, even when the head angle φ of the head 3 is changed by the driver 2, the controller 1 can accurately determine the liquid discharge amount M.

In the present embodiment, the controller determines the liquid discharge timing $\Delta t$ based on the target distance d and the relative movement speed v between the head 3 and the object 200. Thus, even when the relative movement speed v is high, the controller 1 can accurately determine the liquid discharge timing $\Delta t$.

Although the embodiments have been described above, embodiments of the present disclosure are not limited to the above embodiments. That is, various modifications and improvements can be made within the scope of the present disclosure.

In the above-described embodiments, examples of the liquid discharged from the head 3 include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. These liquids can be used for, e.g., inkjet ink, coating paint, surface treatment solution, a liquid for forming components of electronic element or light-emitting element or a resist pattern of electronic circuit, or a material solution for three-dimensional fabrication.

The object 200 represents a material onto which liquid is adhered and fixed, a material into which liquid is adhered to permeate, or the like. Specific examples of the "material onto which liquid can adhere" include, but are not limited to, a body of a vehicle, a construction material, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Embodiments also include a liquid discharge method. For example, a liquid discharge method includes discharging a liquid from each of multiple nozzles of a head to an object in a flight direction to form a film on a surface of the object, moving at least one of the head or the object relative to other of the head or the object, determining an amount of the liquid discharged from each of the multiple nozzles based on a flight angle between the flight direction and a normal direction of the surface of the object for each of the multiple nozzles, and discharging the liquid from each of the multiple nozzles for the amount of the liquid determined for each of the multiple nozzles. Such a liquid discharge method can provide operational effects equivalent to those of the above-described liquid discharge apparatus.

Embodiments also include a storage medium storing computer-readable program instructions and a computer-readable program product. For example, a non-transitory storage medium storing a plurality of instructions which, when executed by one or more processors, causes the processors to perform a method including discharging a liquid from each of multiple nozzles of a head to an object in a flight direction to form a film on a surface of the object, moving at least one of the head or the object relative to other of the head or the object, determining an amount of the liquid discharged from each of the multiple nozzles based on a flight angle between the flight direction and a normal direction of the surface of the object for each of the multiple nozzles, and discharging the liquid from each of the multiple nozzles for the amount of the liquid determined for each of the multiple nozzles. A storage medium or a computer-readable program product including such program code can provide operational effects equivalent to those of the above-described liquid discharge apparatus.

As a result, according to the present disclosure, the liquid discharge apparatus that forms a film having good uniformity can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A liquid discharge apparatus comprising:

a head having multiple nozzles and configured to discharge a liquid from each of the multiple nozzles to an object in a flight direction to form a film on a surface of the object;

a driver configured to move at least one of the head or the object relative to other of the head or the object; and circuitry configured to:

determine an amount of the liquid discharged from each of the multiple nozzles based on a flight angle between the flight direction and a normal direction of the surface of the object for each of the multiple nozzles; and cause the head to discharge the liquid from each of the multiple nozzles for the amount of the liquid determined for each of the multiple nozzles, wherein the head includes a plurality of valves, each of the valves being configured to individually open and close a corresponding one of the multiple nozzles to discharge the liquid to the object from the corresponding one of the multiple nozzles, and the amount of the liquid discharged from each of the multiple nozzles is adjusted by changing a length of a liquid discharge period for discharging the liquid.

2. The liquid discharge apparatus according to claim 1, wherein the circuitry is further configured to determine the amount of the liquid discharged from each of the multiple nozzles according to a following equation:

$$M = M_0/\cos^2\theta,$$

where M represents the amount of the liquid discharged from each of the multiple nozzles, θ represents the flight angle, and $M_0$ represents the amount of the liquid discharged at the flight angle θ of 0 degrees.

3. The liquid discharge apparatus according to claim 1, wherein the driver is further configured to change a head angle between the flight direction and a direction of gravity, and the circuitry is further configured to determine the amount of the liquid discharged from each of the multiple nozzles based on the flight angle, a target distance between the object and each of the multiple nozzles, and the head angle.

4. The liquid discharge apparatus according to claim 1, wherein the circuitry is further configured to determine a liquid discharge timing at which the liquid is discharged from each of the multiple nozzles for each of the multiple nozzles based on a target distance between the object and each of the multiple nozzles.

5. The liquid discharge apparatus according to claim 4, wherein the circuitry is further configured to:

divide a trajectory of relative movement between the object and each of the multiple nozzles by discharge intervals between discharge positions, at which the liquid is discharged from each of the multiple nozzles, to obtain division points; and determine the liquid discharge timing based on the target distance at each of the division points.

6. The liquid discharge apparatus according to claim 4, wherein the circuitry is further configured to determine the liquid discharge timing based on the target distance and a speed of relative movement between the head and the object for each of the multiple nozzles.

7. A liquid discharge method comprising:

discharging a liquid from each of multiple nozzles of a head to an object in a flight direction to form a film on a surface of the object;

moving at least one of the head or the object relative to other of the head or the object;

determining an amount of the liquid discharged from each of the multiple nozzles based on a flight angle between the flight direction and a normal direction of the surface of the object for each of the multiple nozzles; and discharging the liquid from each of the multiple nozzles for the amount of the liquid determined for each of the multiple nozzles, wherein the head includes a plurality of valves, each of the valves being configured to individually open and close a corresponding one of the multiple nozzles to discharge the liquid to the object from the corresponding one of the multiple nozzles, and the amount of the liquid discharged from each of the multiple nozzles is adjusted by changing a length of a liquid discharge period for discharging the liquid.

8. A non-transitory storage medium storing a plurality of instructions which, when executed by one or more processors, causes the processors to perform a method, comprising:

discharging a liquid from each of multiple nozzles of a head to an object in a flight direction to form a film on a surface of the object;

moving at least one of the head or the object relative to other of the head or the object;

determining an amount of the liquid discharged from each of the multiple nozzles based on a flight angle between the flight direction and a normal direction of the surface of the object for each of the multiple nozzles; and discharging the liquid from each of the multiple nozzles for the amount of the liquid determined for each of the multiple nozzles, wherein the head includes a plurality of valves, each of the valves being configured to individually open and close a corresponding one of the multiple nozzles to discharge the liquid to the object from the corresponding one of the multiple nozzles, and the amount of the liquid discharged from each of the multiple nozzles is adjusted by changing a length of a liquid discharge period for discharging the liquid.

* * * * *